(12) United States Patent
Hentges et al.

(10) Patent No.: US 8,094,413 B1
(45) Date of Patent: Jan. 10, 2012

(54) DISK DRIVE HEAD SUSPENSION FLEXURE WITH STACKED TRACES HAVING DIFFERING CONFIGURATIONS ON GIMBAL AND BEAM REGIONS

(75) Inventors: Reed T. Hentges, Buffalo, MN (US); Alexander J. Rice, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 271 days.

(21) Appl. No.: 12/580,314

(22) Filed: Oct. 16, 2009

Related U.S. Application Data (60) Provisional application No. 61/196,840, filed on Oct. 21, 2008.

(51) Int. Cl.
*G11B 21/21* (2006.01)
(52) U.S. Cl. .................................... 360/245.9
(58) Field of Classification Search ................ 360/245.9
See application file for complete search history.

(56) References Cited

U.S. PATENT DOCUMENTS

| | | | |
|---|---|---|---|
| 5,491,597 A | 2/1996 | Bennin et al. | |
| 5,598,307 A * | 1/1997 | Bennin | 360/245.9 |
| 5,608,591 A | 3/1997 | Klaassen | |
| 5,645,735 A | 7/1997 | Bennin et al. | |
| 5,666,717 A | 9/1997 | Matsumoto et al. | |
| 5,687,479 A | 11/1997 | Bennin et al. | |
| 5,694,270 A | 12/1997 | Sone et al. | |
| 5,737,152 A | 4/1998 | Balakrishnan | |
| 5,835,306 A * | 11/1998 | Bennin | 360/234.5 |
| 5,839,193 A | 11/1998 | Bennin et al. | |
| 5,862,010 A | 1/1999 | Simmons et al. | |
| 5,883,759 A | 3/1999 | Schulz | |
| 5,995,328 A * | 11/1999 | Balakrishnan | 360/245.9 |
| 6,134,075 A | 10/2000 | Bennin et al. | |
| 6,587,310 B1 | 7/2003 | Bennin et al. | |
| 6,608,736 B1 | 8/2003 | Klaassen et al. | |
| 6,798,597 B1 | 9/2004 | Aram et al. | |
| 6,900,967 B1 | 5/2005 | Coon et al. | |
| 6,975,488 B1 | 12/2005 | Kulangara et al. | |
| 7,006,330 B1 * | 2/2006 | Subrahmanyam et al. | 360/234.5 |
| 7,144,687 B2 | 12/2006 | Fujisaki et al. | |
| 7,242,266 B2 | 7/2007 | Peterson | |
| 7,417,818 B2 | 8/2008 | Yuuki et al. | |
| 7,518,830 B1 * | 4/2009 | Panchal et al. | 360/245.8 |
| 7,697,237 B1 * | 4/2010 | Danielson | 360/245.9 |
| 7,710,687 B1 * | 5/2010 | Carlson et al. | 360/244.3 |
| 2007/0133128 A1 | 6/2007 | Arai | |

FOREIGN PATENT DOCUMENTS

JP 10003632 A 1/1998

* cited by examiner

*Primary Examiner* — Mark Blouin
(74) *Attorney, Agent, or Firm* — Faegre & Benson LLP (57) ABSTRACT

An integrated lead head suspension component comprising a spring metal layer, a first conductor layer, a first dielectric layer between at least portions of the spring metal and the first conductor layers, a second conductor layer and a second dielectric layer between at least portions of the first and second conductor layers. The head suspension component includes stacked traces having first and second traces in the first and second conductor layers, respectively. The stacked traces comprise base sections having first widths and gimbal sections having second widths that are less than the first widths. The second dielectric layer can have a generally constant thickness on the base and gimbal sections or, alternatively, a gimbal section thickness that is less than a base section thickness.

20 Claims, 8 Drawing Sheets

DISK DRIVE HEAD SUSPENSION FLEXURE WITH STACKED TRACES HAVING DIFFERING CONFIGURATIONS ON GIMBAL AND BEAM REGIONS

CROSS-REFERENCE TO RELATED APPLICATION

This application claims the benefit of U.S. Provisional Patent Application No. 61/196,840 filed Oct. 21, 2008 which is incorporated herein by reference in its entirety and for all purposes.

TECHNICAL FIELD

The invention is a head suspension component for use in a hard disk drive. In particular, the invention is a wireless or integrated lead head suspension component having stacked trace conductor elements.

BACKGROUND OF THE INVENTION

Integrated lead or wireless disk drive head suspensions and head suspension components are well known and disclosed in, for example, the Arai U.S. Patent Application Publication 2007/0133128, the Sone et al. U.S. Pat. No. 5,694,270 and the Klaassen et al. U.S. Pat. No. 6,608,736. These devices generally include a flexure mounted to a load beam or integrated into the suspension. A magnetic head slider is mounted to a gimbal region of the flexure. The flexure typically includes a spring metal layer and a conductor layer. The conductor layer includes a plurality of conductors or traces extending between terminal pads on opposite ends of the suspension for electrically connecting the magnetic head to disk drive circuitry. A layer of insulating or dielectric material separates the traces from the spring metal layer. A cover layer or cover coat layer may be formed on the portions of the traces opposite the insulating layer.

Subtractive and/or additive processes can be used to manufacture these devices. Subtractive manufacturing processes as disclosed in, for example, the Bennin et al. U.S. Pat. No. 5,839,193 use photolithography and etching processes to form the flexure from laminate material stock having a spring metal layer and conductor layer separated by an insulating layer. Additive manufacturing processes as disclosed in, for example, the Matsumoto et al. U.S. Pat. No. 5,666,717 use photolithography, deposition and etching processes to add the insulating layer, conductor layer and other structures to the spring metal layer.

One characteristic of integrated lead head suspension components is that the spring metal layer acts as a ground plane for the traces. For a number of reasons, including the relatively thin dielectric layer, the traces and spring metal layer can be electrically coupled. These electrical characteristics can reduce the signal performance characteristics of the traces. In addition, the area available for routing traces continues to decrease as the trend towards smaller magnetic head sliders drives smaller head suspensions and head suspension components. To compensate for spatial constraints and improve signal transmission between the magnetic head slider and disk drive circuitry, a multi layer or stacked trace configuration may be utilized.

For example, the Sone et al. U.S. Pat. No. 5,694,270, discloses a first conductor pattern formed on the suspension and flexure through an insulator layer and a second conductor pattern laminated or stacked on the first conductive pattern through a second insulator layer to accommodate reduced width flexure beam elements. In another example, the Klaassen et al. U.S. Pat. No. 6,608,736 discloses read line traces arranged on top of each other and separated by a dielectric layer to increase the data rate that can be transferred between the magnetic head and drive circuitry preamplifier. In still another example, the Arai U.S. Patent Application Publication 2007/0133128 discloses a high conductivity ground layer under portions of the write traces and separated by an insulating layer to lower the trace impedance and lower signal transmission loss.

Recent trends in hard disk drive technology require electrical and mechanical suspension characteristics that increase the bandwidth of signal transmission, decrease differential impedance of the traces and decrease stiffness in the gimbal region of the flexure. Modifying the trace configuration to optimize one of these characteristics can have negative impacts on the other characteristics. Bandwidth is directly proportional to the distance, d, separating the stacked traces. Differential impedance is directly proportional to the distance, d, and inversely proportional to the width, w, of the stacked traces. Stiffness is directly proportional to the width, w, and the square of the distance, d. Increasing bandwidth by increasing the distance, d, has a negative impact (increases) on both differential impedance and gimbal stiffness. Reducing differential impedance by increasing the width, w, has a negative impact (increases) on gimbal stiffness.

There remains a need for stacked integrated lead trace structures that provide improved electrical characteristics without negatively impacting the mechanical performance of the head suspension. To be commercially viable any such structures must be capable of being efficiently manufactured.

SUMMARY OF THE INVENTION

The invention is an integrated lead head suspension component formed by an additive process and including a base region and a gimbal region. The gimbal region includes a slider mounting region and slider terminal pads adjacent the slider mounting region. The head suspension component comprises a spring metal layer, a first conductor layer, a first dielectric layer between at least portions of the spring metal and the first conductor layers, a second conductor layer and a second dielectric layer between at least portions of the first and second conductor layers. The head suspension component further includes stacked traces having first and second traces in the first and second conductor layers, respectively. The stacked traces comprise base sections extending across at least portions of the base region and gimbal sections extending across the gimbal region from the base region to the slider terminal pads. The base sections of the first and second traces have first widths. The gimbal sections of the first and second traces have second widths that are less than the first widths. The second dielectric layer can have a generally constant thickness on the base and gimbal sections or, alternatively, a gimbal section thickness that is less than a base section thickness.

DETAILED DESCRIPTION

Figure 1:
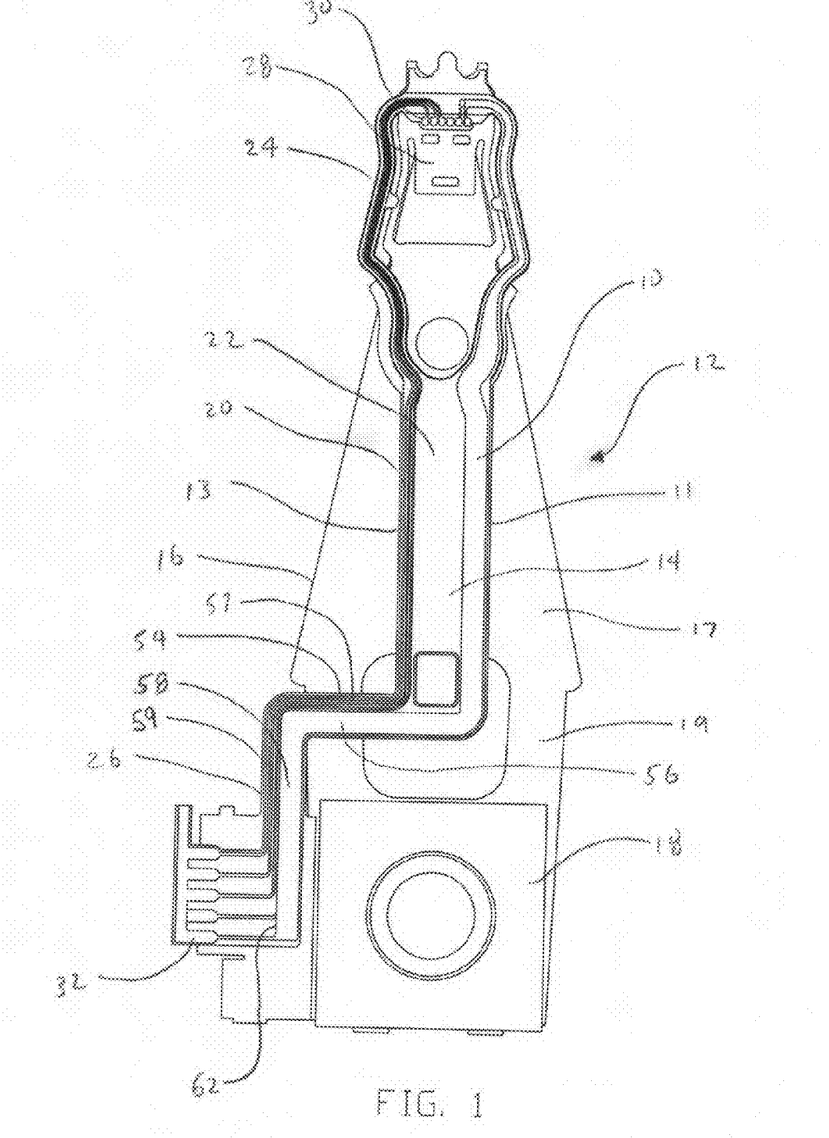
FIG. 1 is a plan view of an integrated lead head suspension having stacked traces in accordance with the present invention.

FIG. 1 is an illustration of a head suspension 12 including integrated lead suspension component or flexure 14 having stacked traces 10 on a first side 11 and mulit-layer traces 20 (described in more detail with respect to FIG. 10) on a second side 13 in accordance with one embodiment of the present invention. As shown, suspension 12 includes load beam 16 and base plate 18. Load beam 16 includes rigid region 17 and spring region 19. Integrated lead flexure 14 and base plate 18 are welded or otherwise attached to the load beam 16.

In the illustrated embodiment, flexure 14 includes base region 22, gimbal region 24, tail region 26 and spring region 54 between the base and tail regions. Gimbal region 24 further includes slider mounting region 28 and slider terminal pads 30 adjacent slider mounting region 28. Tail region 26 further includes tail termination pads 32. Slider terminal pads 30 are connected to tail termination pads 32 via traces 10, 20.

Figure 2:
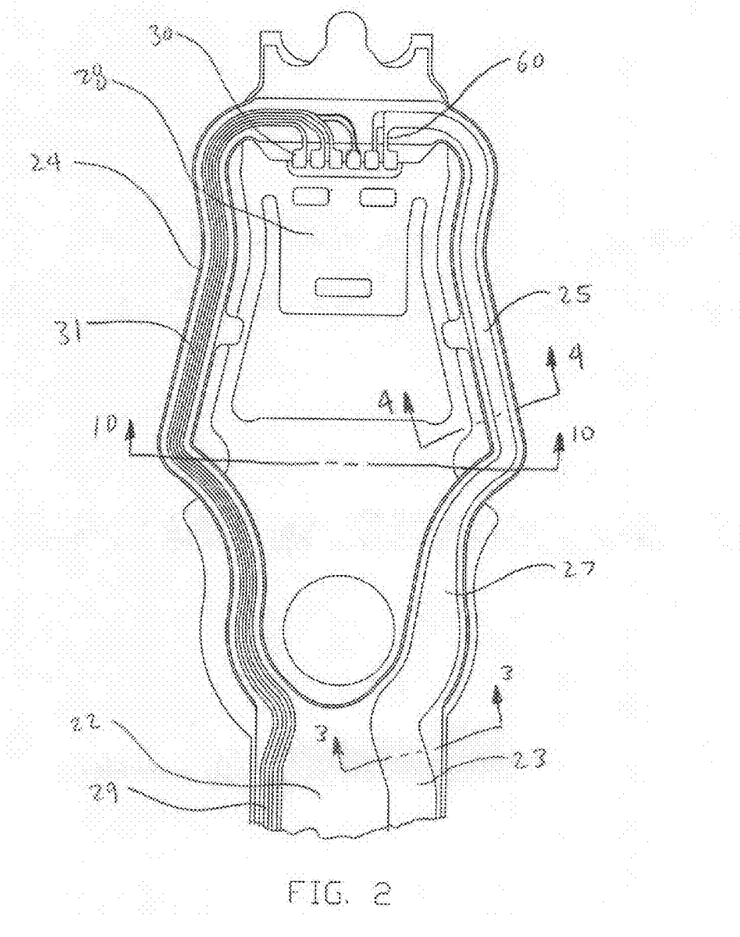
FIG. 2 is a fragmentary plan view of one embodiment of the flexure shown in FIG. 1.

As shown in FIG. 2, which is a detailed view of the base and gimbal regions 22, 24, respectively, of flexure 14, stacked traces 10 include base sections 23, gimbal sections 25 and transition sections 27 between the base and gimbal sections. Multi layer traces 20 include base sections 29 and gimbal sections 31. Base sections 23, 29 extend across at least portions of the base region 22. Gimbal sections 25, 31 extend across the gimbal region 24 from the base region 22 to the slider terminal pads 30. Gimbal sections 25, 31 may be generally free from spring metal layer 15 (FIG. 3), otherwise known as flying leads or flying traces. Gimbal sections 25, 31 having at least portions of the traces 10, 20 backed by spring metal layer 15 are also contemplated.

Referring back to FIG. 1, stacked traces 10 further include tail sections 58 and spring sections 56 between the base sections 23 and tail sections 58. Multi layer traces 20 further include tail sections 59 and spring sections 57 between base sections 29 and tail sections 59. In the embodiment shown, spring sections 56, 57 extend across spring region 54, over spring region 19 of the suspension, from the base region 22 to tail region 26. Portions of the spring and tail sections 56, 58 may be free from spring metal layer 15.

Figure 3:
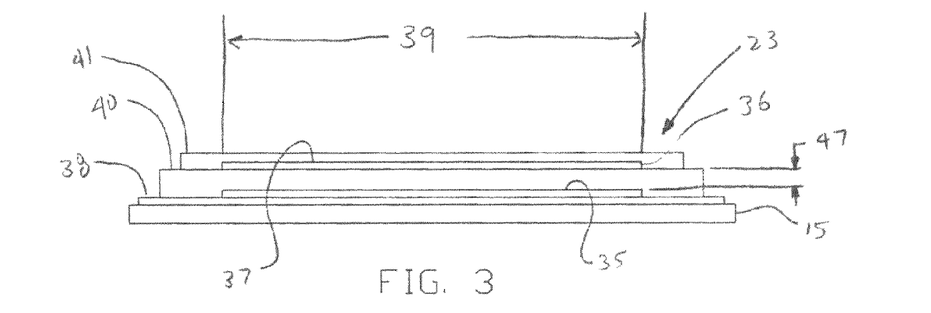
FIG. 3 is a cross sectional view of the stacked traces taken along line 3-3 in FIG. 2.
Figure 4:
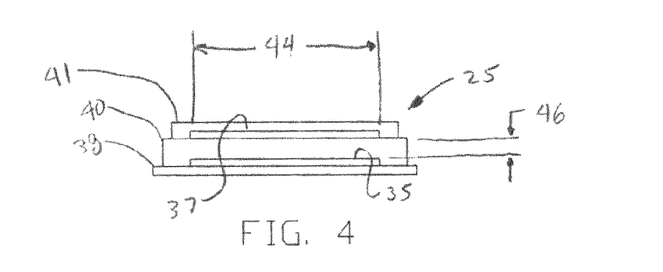
FIG. 4 is a cross sectional view of the stacked traces taken along line 4-4 in FIG. 2.

As shown in FIG. 3, which is a cross sectional view of the base sections 23 of stacked traces 10 taken along line 3-3 in FIG. 2, flexure 14 is comprised of spring metal layer 15 (e.g. stainless steel), a first conductor layer 34 and a second conductor layer 36. A first insulating or dielectric layer 38 is between at least portions of the spring metal and first conductor layers. A second dielectric layer 40 is between at least portions of the first and second conductor layers. Second dielectric layer 40 has a generally constant thickness on base and gimbal sections 23, 25 such that the base section thickness 47 is the same as the gimbal section thickness 46 (FIG. 4). A cover layer 41 may be included over at least portions of second conductor layer 36.

In the illustrated embodiment, stacked traces 10 include a first trace 35 in the first conductor layer 34 and a second trace 37 in the second conductor layer 36. Base sections 23 of stacked traces 10 have first widths 39. As shown in FIG. 4, which is a cross sectional of stacked traces 10 taken along line 4-4 in FIG. 2, gimbal sections 25 have second widths 44 that are less than first widths 39. As shown, the first widths 39 of the base sections 23 of the first and second traces 35, 37 are approximately equal and the second widths 44 of the gimbal sections 25 of the first and second traces 35, 37 are approximately equal. In other embodiments, not shown, widths of the first traces may be different than widths of the second traces in the base and/or gimbal sections. First widths 39 may gradually taper to second widths 44 over transition sections 27 as illustrated in FIG. 2. Alternatively, widths 39 may change to widths 44 in a discreet step or a series of discreet steps over transition sections 27. In other embodiments, not shown, the stacked traces may include transition sections between the base sections 23 and spring sections 56 over which the widths of the traces taper. In this way, the widths of the traces adjacent the spring region 19 of the suspension may be narrower.

In the embodiment illustrated, stacked traces 10 include stepped areas 60, 62 in the gimbal sections 25 and tail sections 58, respectively. In stepped area 60, second trace 37 steps down to first dielectric layer 38 to connect with slider terminal pads 30. In stepped area 62, second trace 37 steps done to first dielectric layer 38 to connect with tail terminal pads 32. Stepped areas 60, 62 are shown to be in close proximity to terminal pads 30, 32 though embodiments having stepped areas in other locations are contemplated. For example, stepped area 60 may be located part way through gimbal sections 25 and stepped area 62 may be located part way through tail sections 58.

Figure 6:
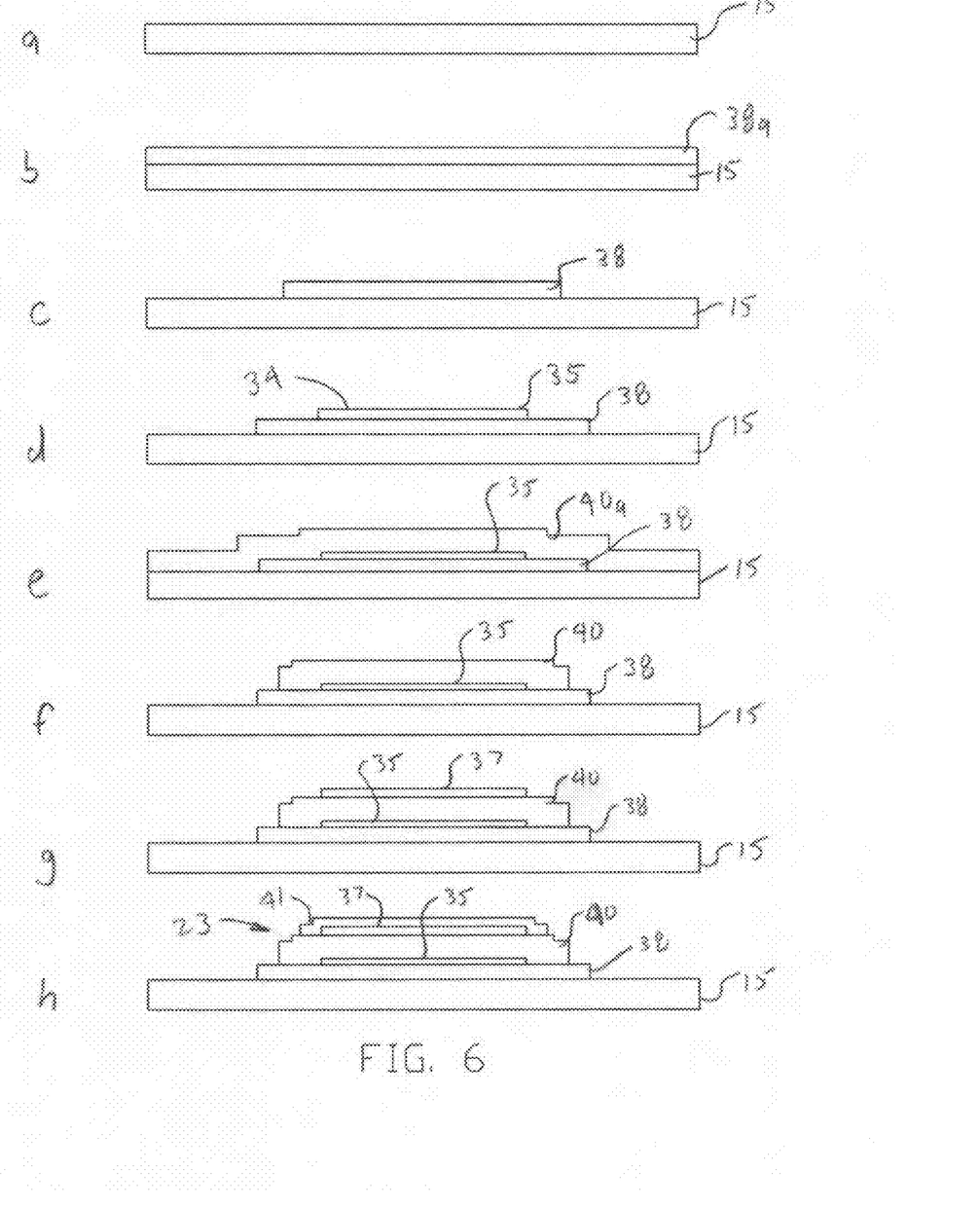
FIG. 6 is a series of cross sectional views showing various stages of one manufacturing process for an integrated lead head suspension component having stacked traces according to the present invention.

FIG. 6 shows cross sectional views of an integrated lead head suspension component having stacked traces at various steps, a-h, of an exemplary manufacturing process according to the present invention. In steps a, b and c, generally known deposition and photolithographic methods are used to coat spring metal layer 15 with dielectric layer 38a which is then exposed, developed and cured to the desired shaped of first dielectric layer 38. In step d, first conductor layer 34 is plated, using known methods, onto first dielectric layer 38 to form the base sections 23, gimbal sections 25, transition sections 27, spring sections 56 and tail sections 58 of first trace 35. Dielectric layer 40a is then applied, exposed, developed and cured to the desired shape of second dielectric layer 40 so as to cover at least portions of the first traces 35 as illustrated in steps e and f. In step g, second conductor layer 36 is plated onto second dielectric layer 40 to form base sections 23, gimbal sections 25, transition sections 27, spring sections 56 and tail sections 58 of second trace 37. A dielectric cover layer 41, as shown in step h, may then be applied, exposed, developed and cured so as to cover at least portions of second trace 37.

Portions of spring metal layer 15 may be removed, using known methods such as chemical etching, to created flying leads.

Figure 5:
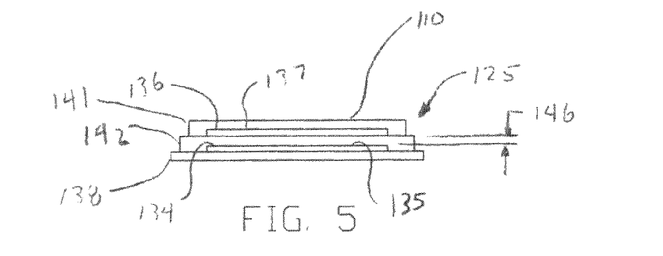
FIG. 5 is a cross sectional view of gimbal sections of the stacked traces according to another embodiment of the present invention.

FIG. 5 shows a cross sectional view of gimbal sections 125 of stacked traces 110 according to another embodiment of the present invention. As shown, stacked traces 110 include a first trace 135 in the first conductor layer 134 and a second trace 137 in the second conductor layer 136. A first dielectric layer 138 supports at least portions of first trace 135. A second dielectric layer 142 is between at least portions of the first and second traces 135, 137. Second dielectric layer 142 has a base section thickness on the base section (not shown) of stacked traces 110 and a gimbal section thickness 146 over gimbal sections 125. In the illustrated embodiment, gimbal section thickness 146 is generally thinner than the base section thickness. The transition from the base section thickness to the gimbal section thickness 146 may be generally gradual, a single discreet step or a series of discreet steps. The transition from the base section thickness to the gimbal section thickness 146 may coincide with the transition from first stacked trace widths 39 to second stacked trace widths 44. Alternately the second dielectric layer thickness transition may occur before or after the stacked trace width transition. A cover layer 141 may be included over at least portions of second trace 137. In other embodiments, not shown, the stacked traces may include transition sections between the base sections 23 and spring sections 56 over which the base section dielectric layer thickness transitions to a spring section dielectric layer thickness. In this way, the thickness of the second dielectric layer 142 adjacent the spring region 19 of the suspension may be thinner.

Figure 7:
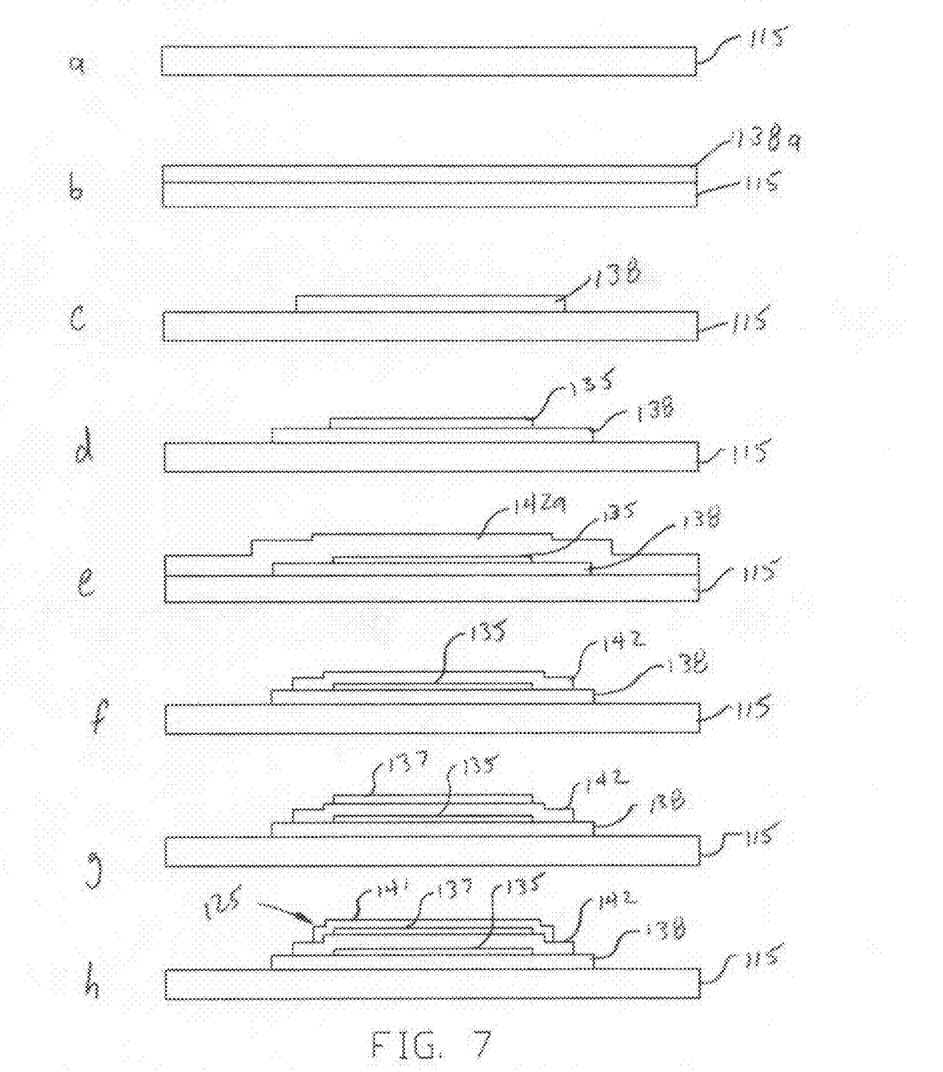
FIG. 7 is a series of cross sectional views showing various stages of one manufacturing process for gimbal sections of an integrated lead head suspension component having stacked traces according to the present invention.

FIG. 7 shows cross-sectional views of an integrated lead head suspension component having a reduced thickness, gimbal section second dielectric layer at various steps of one manufacturing process according to the present invention. In steps a-d, first dielectric layer 138 and base, gimbal and transitions sections of first trace 135 are formed and plated onto spring metal layer 115 as described above. Dielectric layer 142a is applied, exposed, developed and cured to the desired shape of second dielectric layer 142 as shown in steps e and f. To form thinner second dielectric layer 142 in the gimbal sections 125, a partial exposing process may be used. The partial exposing process forms fewer cross-linked polyimide chains such that more material is removed during the development step resulting in a thinner dielectric layer 142. In steps g and h, the base, gimbal and transition sections of second trace 137 and optional dielectric cover layer 141 are then formed as described above. Portions of spring metal layer 115 may be removed, using known methods such as chemical etching, to created flying leads.

Figure 8:
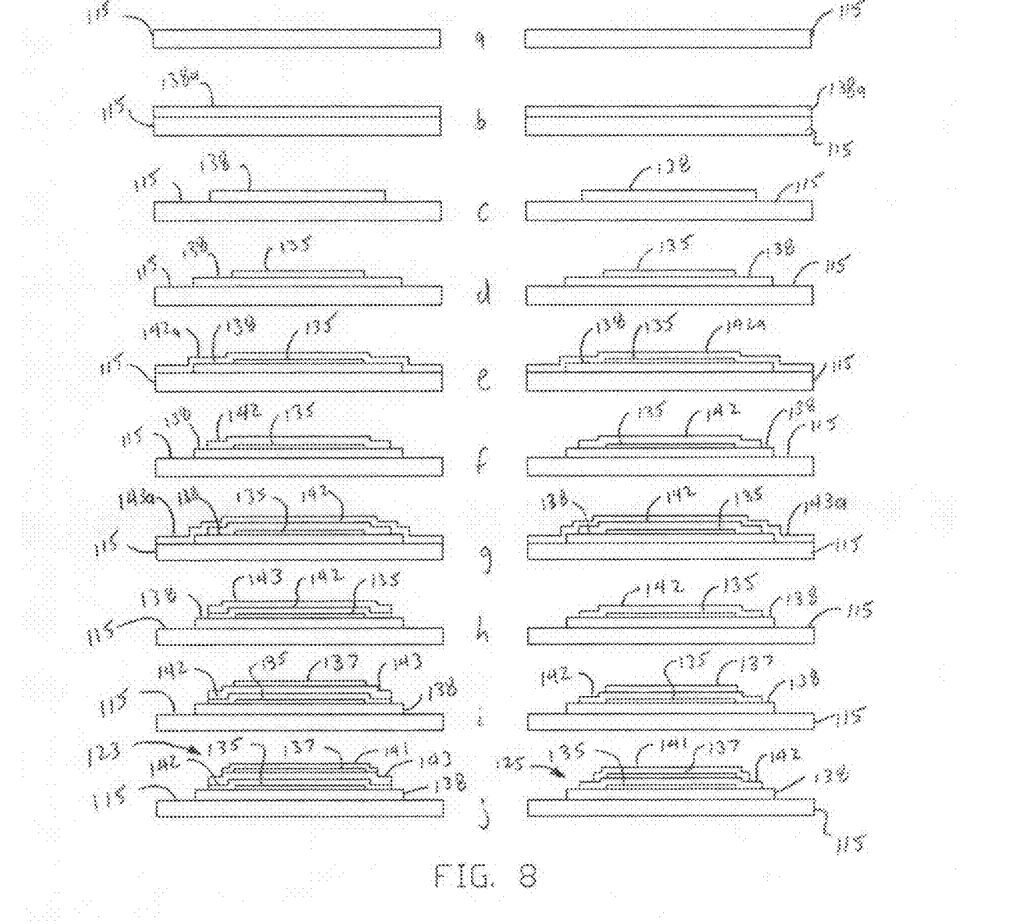
FIG. 8 is a series of cross sectional views showing various stages of another manufacturing process for base and gimbal sections of an integrated lead head suspension component having stacked traces according to the present invention.

FIG. 8 shows cross-sectional views during various steps of an alternate method for manufacturing a reduced thickness, gimbal section second layer dielectric. The left-side series of steps correspond to base section stacked traces 123 and the right-side series of steps correspond to gimbal section stacked traces 125. In steps a-d, first dielectric layer 138 along with the base, gimbal and transitions sections of first trace 135 are formed and plated onto spring metal layer 115 as described above with respect to FIG. 7. In steps e and f, dielectric layer 142a is applied, exposed, developed and cured to the desired shape of second dielectric layer 142. In this method, dielectric layer 143a is applied over the second dielectric layer 142 prior to the steps of forming the second trace 137 as shown in step g. Dielectric layer 143a is then exposed, developed and cured to the desired shape of third dielectric layer 143 so as to remain in base sections 123 and be removed in the gimbal sections 125 as shown in step h. In this way, the base section thickness of the dielectric layer is thicker than the gimbal section thickness 146. In steps i and j, the base, gimbal and transition sections of second trace 137 and optional dielectric cover layer 141 are then formed as described above with respect to FIG. 7. Portions of spring metal layer 115 may be removed, using known methods such as chemical etching, to created flying leads.

Figure 9:
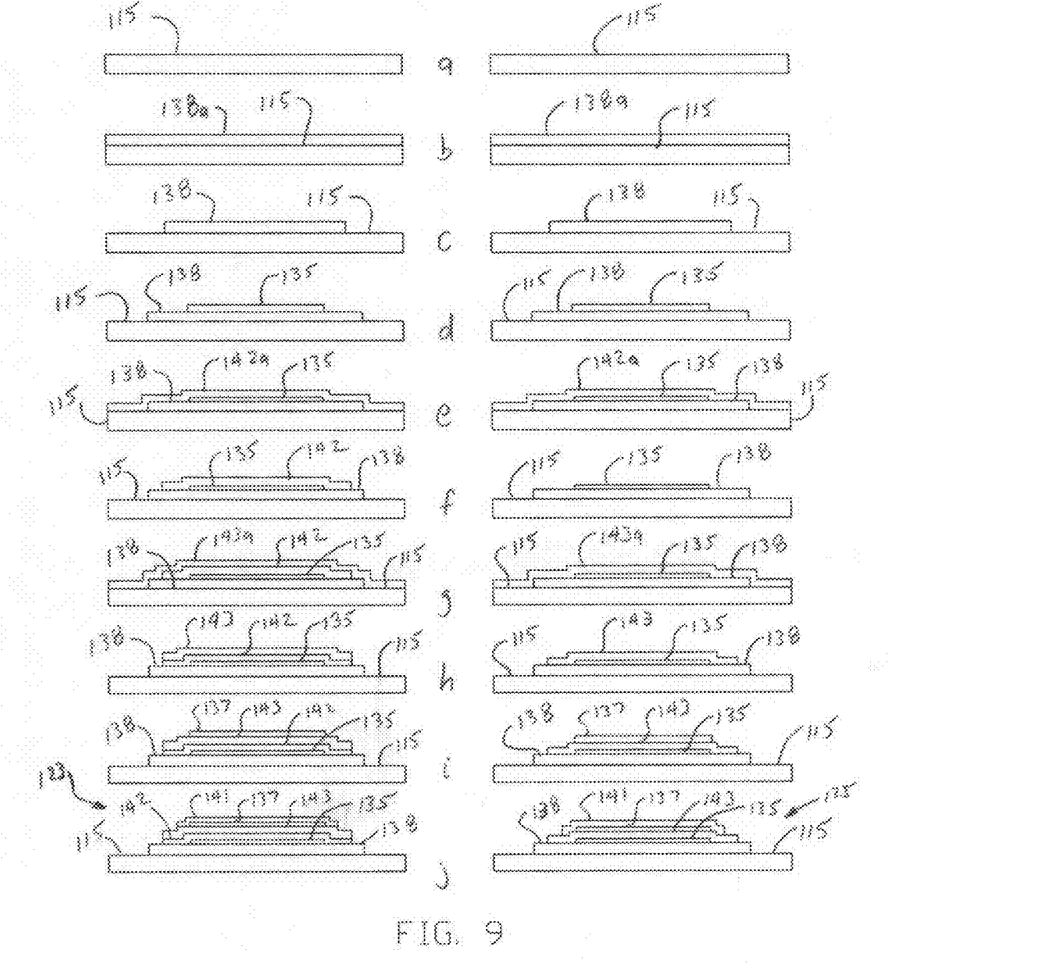
FIG. 9 is a series of cross sectional views showing various stages of yet another manufacturing process for base and gimbal sections of an integrated lead head suspension component having stacked traces according to the present invention.

FIG. 9 shows various steps of another alternate method for manufacturing a reduced thickness, gimbal section second dielectric layer. The left-side series of steps correspond to base section stacked traces 123 and the right-side series of steps correspond to gimbal section stacked traces 125. Steps a-e are as described above with respect to FIG. 8. In this method, dielectric layer 142a is applied, exposed, developed and cured to the desired shape of second dielectric layer 142 so as to remain in base sections 123 and be removed, effectively exposing first traces 135, in gimbal sections 125 as shown in step f. In steps g and h, dielectric layer 143a is then applied, exposed, developed and cured to the desired shape of third dielectric layer 143 over the second dielectric layer 142 in the base sections 123 and the first traces 135 in the gimbal sections 125. In this way, the base section thickness of the dielectric layer is thicker than the gimbal section thickness 146. In steps i an j, the base, gimbal and transition sections of second trace 137 and optional dielectric cover layer 141 are then formed as described above with respect to FIG. 8. Portions of spring metal layer 115 may be removed, using known methods such as chemical etching, to created flying leads.

Figure 10:
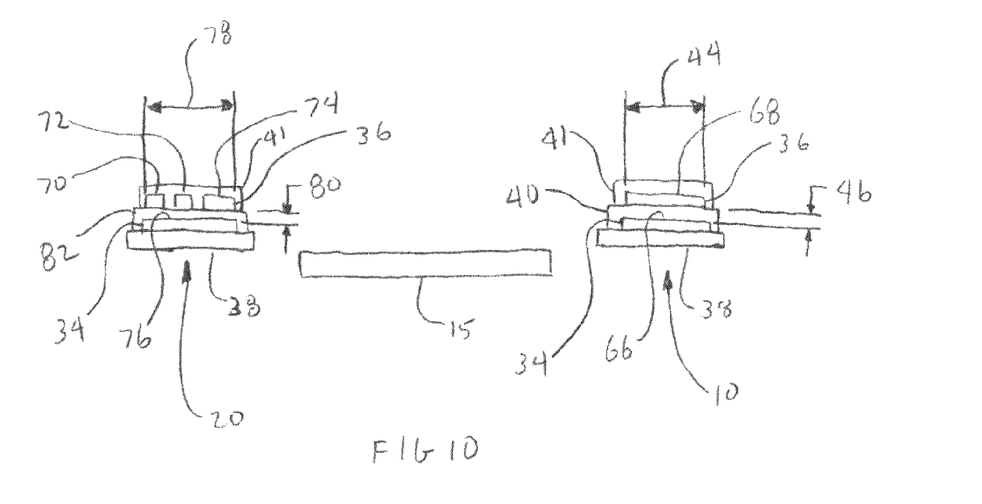
FIG. 10 is a cross sectional view of stacked and multi layer traces, taken along line 10-10 in FIG. 2, according to one embodiment of the present invention.

In one embodiment, shown in FIG. 10, which is a cross section taken along line 10-10 in FIG. 2, stacked traces 10 are writer traces 66, 68 and multi layer traces 20 include reader traces 70, 72, fly height trace 74 and ground trace 76. As illustrated, writer trace 68, reader traces 70, 72 and fly height trace 74 are in second conductor layer 36; writer trace 66 and ground trace 76 are in first conductor layer 34. In other contemplated embodiments, not shown, reader traces 70, 72 may be stacked or both reader traces and writer traces may be stacked. In still other embodiments, not shown, multi layer traces may include additional traces. For example, a sensor trace may be stacked with fly height trace 74. Alternatively, fly height trace 74 and/or sensor trace may be in the first conductor layer and ground trace 76 may be in the second conductor layer.

The reader, fly height and ground traces 70, 72, 74 and 76, respectively are sized and/or positioned such that the mechanical characteristics (e.g. bending stiffness, mass) of multi layer traces 20 are generally the same as the mechanical characteristics of stacked traces 10 in the gimbal region 24. In the illustrated embodiment, overall width 78 of multi layer traces 20 is substantially equal to width 44 of stacked traces 10 and thickness 80 of second dielectric layer 82 between multi layer traces 20 is substantially equal to thickness 46 of second dielectric layer 40 between stacked traces 10. Alternatively, traces 70, 72, 74 and 76 may be sized such that the cross sectional area of multi layer traces 20 is substantially equal to the cross sectional area of stacked traces 10.

In the above illustrated embodiments, first conductor layers 34, 134 and second conductor layers 36, 136 have substantially the same thickness such that traces 35, 37, 135, 137, 66, 68, 70, 72, 74, 76 have substantially the same thickness. In other embodiments, not shown, first conductor layers 34, 134 and second conductor layers 36, 136 may have different thicknesses such that traces 35, 135, 66, 76 in the first conductor layer 34 have different thicknesses than traces 37, 137, 68, 70, 72, 74 in the second conductor layer 36. In still other embodiments, not shown, first and second conductor layers 34, 36 may have variable thicknesses such that base sections 23, 123, 29 of the traces have different thicknesses than gimbal sections 25, 125, 31 of the traces.

Although the present invention has been described with reference to various the embodiments described above, those skilled in the art will recognize that changes can be made in form and detail without departing from the spirit and scope of the invention. For example, the transition sections, over which the stacked traces decrease in width and the second dielectric layer decreases in thickness, may be located part way through the gimbal and/or spring sections. While the invention has been described with respect to a flexure, other embodiments, such as an integrated lead head suspension having the gimbal region incorporated into the load beam, are contemplated as well.

What is claimed is:

1. An integrated lead head suspension component of the type having a base region and a gimbal region, formed by an additive process, comprising:
   a spring metal layer;
   a first conductor layer;
   a first dielectric layer between at least portions of the spring metal layer and the first conductor layer;
   a second conductor layer;
   a second dielectric layer between at least portions of the first and second conductive layers;
   a slider mounting region on the gimbal region;
   slider terminal pads on the gimbal region adjacent to the slider mounting region;
   and
   stacked traces including a first trace in the first conductor layer and a second trace in the second conductor layer, the stacked traces comprising base sections extending across at least portions of the base region and gimbal sections extending across the gimbal region from the base region to the slider terminal pads, and wherein:
      the base sections of the first and second traces have first widths;
      the gimbal sections of the first and second traces have second widths that are less than the first widths; and
      the second dielectric layer has a generally constant thickness on the base and gimbal sections.

2. The integrated lead head suspension component of claim 1 wherein:
   the first widths of the base sections of the first and second traces are equal; and
   the second widths of the gimbal sections of the first and second traces are equal.

3. The integrated lead head suspension component of claim 2 wherein:
   the stacked traces include transition sections between the base and gimbal sections; and
   the first widths gradually tapering to the second widths over the transition section.

4. The integrated lead head suspension component of claim 3 wherein the gimbal sections of the stacked traces are flying leads generally free from the spring metal layer.

5. The integrated lead head suspension component of claim 4 wherein:
   the stacked traces are on a first side of the flexure; and
   the flexure further includes a plurality of multi layer traces on a second side of the flexure that is transverse to the first side, and wherein the multi layer traces comprise base sections extending across at least portions of the base region and gimbal sections extending across the gimbal region from the base region to the slider terminal pads, and wherein the gimbal sections of the multi layer traces are flying leads generally free from the spring metal layer.

6. The integrated lead head suspension component of claim 5 wherein:
   the stacked traces are writer traces;
   the multi layer traces include a plurality of reader traces and at least one of a ground trace, fly height trace and sensor trace in the first and second conductor layers, and wherein the multi layer traces are sized such that the mechanical characteristics of the multi layer traces are generally the same as the mechanical characteristics of the stacked traces in the gimbal region.

7. The integrated lead head suspension component of claim 6 wherein:
   the plurality of reader traces are in the second conductor layer and at least one of the ground trace, fly height trace and sensor trace is in the first conductor layer.

8. An integrated lead head suspension component of the type having a base region and a gimbal region, formed by an additive process, comprising:
   a spring metal layer;
   a first conductor layer;
   a first dielectric layer between at least portions of the spring metal layer and the first conductor layer;
   a second conductor layer;
   a second dielectric layer between at least portions of the first and second conductive layers;
   a slider mounting region on the gimbal region
   slider terminal pads on the gimbal region adjacent to the slider mounting region;
   and
   stacked traces including a first trace in the first conductor layer and a second trace in the second conductor layer, the stacked traces comprising base sections extending across at least portions of the base region and gimbal sections extending across the gimbal region from the base region to the slider terminal pads, and wherein:
      the base sections of the first and second traces have first widths;
      the gimbal sections of the first and second traces have second widths that are less than the first widths; and
      the second dielectric layer has a gimbal section thickness that is less than a base section thickness.

9. The integrated lead head suspension component of claim 8 wherein:
   the first widths of the base sections of the first and second traces are equal; and
   the second widths of the gimbal sections of the first and second traces are equal.

10. The integrated lead head suspension component of claim 9 wherein:
    the stacked traces include transition sections between the base and gimbal sections; and
    the first widths gradually tapering to the second widths over the transition sections.

11. The integrated lead head suspension component of claim 10 wherein the base section thickness gradually tapers to the gimbal section thickness over the transition sections.

12. The integrated lead head suspension component of claim 11 wherein the gimbal sections of the stacked traces are flying leads generally free from the spring metal layer.

13. The integrated lead head suspension component of claim 12 wherein:
    the stacked traces are on a first side of the flexure; and
    the flexure further includes a plurality of multi layer traces on a second side of the flexure that is transverse to the first side, and wherein the multi layer traces comprise base sections extending across at least portions of the base region and gimbal sections extending across the gimbal region from the base region to the slider terminal pads, and wherein the gimbal sections of the multi layer traces are flying leads generally free from the spring metal layer.

14. The integrated lead head suspension component of claim 13 wherein:
the stacked traces are writer traces;
the multi layer traces include a plurality of reader traces and at least one of a ground trace, fly height trace and sensor trace in the first and second conductor layers, and wherein the multi layer traces are sized such that the mechanical characteristics of the multi layer traces are generally the same as the mechanical characteristics of the stacked traces in the gimbal region.

15. The integrated lead head suspension component of claim 14 wherein:
the plurality of reader traces are in the second conductor layer and at least one of the ground trace, fly height trace and sensor trace is in the first conductor layer.

16. An additive process for making an integrated lead head suspension component; comprising:
providing a spring metal layer;
etching the spring metal layer to form a base region and a gimbal region having a slider mounting region;
forming stacked traces on the spring metal layer, the stacked traces comprising base sections extending across at least portions of the base region and gimbal sections extending across the gimbal region from the base region, including:
applying a generally constant thickness first dielectric layer on at least portions of the spring metal layer;
depositing a first conductive layer trace over at least portions of the first dielectric layer;
applying a generally constant thickness second dielectric layer on at least portions of the first conductive layer trace;
depositing a second conductive layer trace over at least portions of the second dielectric layer and the first conductive layer trace;
causing the base sections of the first and second traces to have first widths; and
causing the gimbal sections of the first and second traces to have second widths that are less than the first widths.

17. The process of claim 16 including:
causing the second dielectric layer to have a gimbal section thickness and a base section thickness; and
causing at least portions of the gimbal section thickness to be less than the base section thickness.

18. The process of claim 17 wherein the step of causing the gimbal section thickness to be less than the base section includes:
partially exposing at least portions of the second dielectric layer.

19. The process of claim 17 wherein the step of applying a generally constant thickness second dielectric layer includes:
applying a third dielectric layer on at least portions of the second dielectric layer; and
exposing and developing the third dielectric layer such that it remains between at least portions of the first and second traces in the base sections and is removed from between least portions of the first and second traces in the gimbal sections.

20. The process of claim 17 wherein the step of applying a generally constant thickness second dielectric layer includes:
exposing and developing the second dielectric layer such that it remains between at least portions of the first and second traces in the base sections and is removed from between least portions of the first and second traces in the gimbal sections; and
applying a third dielectric layer on at least portions of the second dielectric layer and at least portions of the first conductive trace layer.

* * * * *